United States Patent [19]

Coutts

[11] 3,967,575

[45] July 6, 1976

[54] BICYCLE SAFETY WARNING FLAG

[75] Inventor: Barbara Coutts, Toronto, Canada

[73] Assignee: Lawrence Peska Associates, Inc., New York, N.Y. ; a part interest

[22] Filed: Apr. 15, 1974

[21] Appl. No.: 460,822

[52] U.S. Cl. ............................ 116/35 A; 280/289 R
[51] Int. Cl.² ........................................... B60Q 1/34
[58] Field of Search ............. 116/28 R, 35 R, 35 A, 116/52, 173; 248/40, 42, 43; 280/289; 403/57; 40/165, 129 R, 129 C

[56] References Cited
UNITED STATES PATENTS

| | | | |
|---|---|---|---|
| 1,794,014 | 2/1931 | Gutierrez | 116/35 A |
| 1,806,059 | 5/1931 | Hoople | 403/57 X |
| 1,847,115 | 4/1932 | Kummerle et al. | 116/35 A |
| 2,324,614 | 7/1943 | Dalton | 248/40 X |
| 2,586,643 | 2/1952 | Garlow | 116/173 |
| 2,802,443 | 8/1957 | Hanson | 116/28 R |
| 3,169,739 | 2/1965 | Yacobian | 116/173 X |
| 3,540,406 | 11/1970 | Dexter | 116/173 |

FOREIGN PATENTS OR APPLICATIONS

| | | | |
|---|---|---|---|
| 1,034,510 | 7/1953 | France | 116/52 |
| 936,465 | 9/1963 | United Kingdom | 116/28 R |

Primary Examiner—Richard C. Queisser
Assistant Examiner—Daniel M. Yasich

[57] ABSTRACT

A safety signal warning flag device for mounting on bicycles and other pedalled wheeled vehicles, in order to make them more visible to motorists, other cyclists and to pedestrians for mutual safety. The device includes a flag pole with a highly visible colored flag carried on one end of the pole, and the other end of the pole engaging a supporting base carried on a rear mudguard or fender of the bicycle. The device includes a universal swivel joint in which there is a spherical member secured to the lower end of the flag pole, and a hollow socket member forming a base on the fender, so that the flag pole can be swiveled into any desired angular position, to indicate the location and presence of the bicycle to warn motorists to keep their distance therefrom.

1 Claim, 4 Drawing Figures

BICYCLE SAFETY WARNING FLAG

This invention relates to improvements in bicycle safety warning flags for protection of bicyclists in traffic.

An object of the invention is to provide a novel and improved signal and flag device which is attachable to a bicycle for giving a highly visible indication of the presence on the highway or road of the bicycle and the cyclist thereon, for the safety of the cyclist from motorists and autos.

Another object of the invention is to provide a novel and improved signal and flag device which includes a main base portion attachable to the rearward portion of a bicycle rear fender, with an extensible flag supporting arm carried by the main base portion, with a signal warning flag on the outer end portion of the supporting arm, the flag supporting arm being pivotally mounted on the main base portion to allow it universal movement to any position, right, left, upright or backward, to give highly visible warning to motorists and other bicycles and pedestrians of the bicycle to avoid accidental collisions.

A further object of the invention is to provide a novel and improved signal warning flag device in which the signal flag portion is made of heavy sheet material, such as canvas, plastics, or other material, or even light-weight metal such as aluminum, or sheet steel, which can be coated with a fluorescent paint or luminescent paint which will glow in the dark, and respond to incidence of motor vehicle lights shining thereon, to make it highly visible, and in which the flag supporting arm itself is also coated with such visible paint.

Still another object of the invention is to provide a novel and improved signal warning flag device which also carries a direction signal to indicate to other traffic the desired turn of the cyclist, right, left, straight ahead or the like.

Still a further object of the invention is to provide a novel and improved signal warning and safety flag device which is simple in design, made of few parts, and which can be manufactured by hand with simple tools, or by mass production methods in quantities, at low cost to bring it within reach of every cyclist to induce universal use to reduce accidents.

The above and other objects and advantages of the invention will become apparent from the following description of a preferred embodiment thereof, as illustrated in the accompanying drawings, forming a part hereof.

In connection with the use of such bicycle type vehicles as bicycles, tricycles, mini-bikes and motorcycles, it has been observed of late that there are many more accidents to cyclists than before, especially to be found to result because the motorists are not aware of the presence of the cyclist, and hence do not take care to maintain a safe distance, and hence may crowd him or her off the road or collide with the cyclist.

The present invention is intended to provide a solution to this most important problem, by placing on the cycle a flag carried by a flag post or staff which can be angularly oriented to any position extending from the cycle, and which is highly visible to motorists, other cyclists and pedestrians, even at night or in dark conditions.

In order to understand clearly the nature of the invention and the best means for carrying it out, reference may be had to the drawings, in which like numerals denote similar parts throughout the several views.

Figure 1:
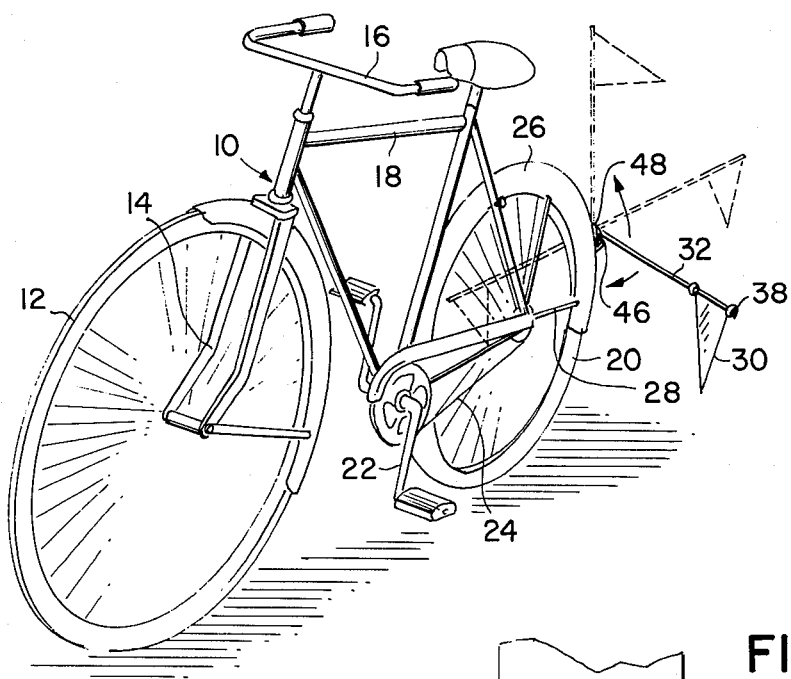
FIG. 1 is a perspective side view of a bicycle with the signal warning flag device in position thereon, and indicating various possible positions of the flag device.

As shown in FIG. 1, there is a bicycle 10 with front wheel 12 mounted on a front swivelable fork 14, with handle bars 16 carried by a frame 18, and a rear wheel 20 driven by foot pedals 22 coupled by chain 24 to the rear wheel for driving it. The rear wheel is covered by a rear mudguard or fender 26 which is attached to the frame 18 and to the rear axle by a strut member 28.

While FIG. 1 shows a standard pedal driven type of bicycle, by way of example, the invention is applicable to a tricycle or mini-bike, for insuring safety for the cyclist. In order to accomplish this, I provide a signal warning flag 30, which may be made of suitable sheet material, such as plastics, canvas, light weight metal, or other materials, and it is coated with or impregnated with a brightly colored paint which is readily visible in the light and in dusk or darkness, such as for example, a bright orange coating which is fluorescent and luminescent so that it glows in the dark and becomes highly visible when oncoming vehicles shine their lights on it.

According to one embodiment as shown, the flag may be triangular in shape, and is attached to the flag staff or post 32 in any suitable manner, as by insertion of the flag staff through a looped passage 34 formed in the margin of the flag by stitching at 36, so that the flag is free to rotate about the axis of the flag staff or pole in any direction. To hold the flag in position on the pole, two nuts or clamps 28 may be secured to the pole to avoid displacement of the flag along the pole.

If it is desired that the flag not be free to rotate, then the stitching 36 may be quite tight so friction holds the flag against rotation. The flag pole 32 is of substantial length, to hold the flag in extended position at least a distance of about 14 or 16 inches, for good visibility.

Figure 2:
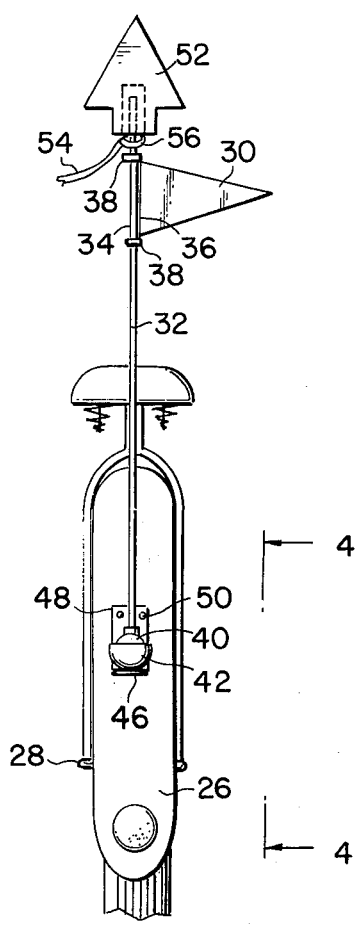
FIG. 2 is a side elevational view of the flag device in upraised position on the fender.
Figure 3:
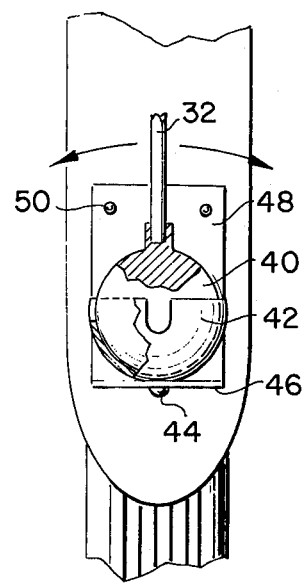
FIG. 3 is an elevational detail view similar to that of FIG. 2, but on an enlarged scale showing the base mounting of the device.
Figure 4:
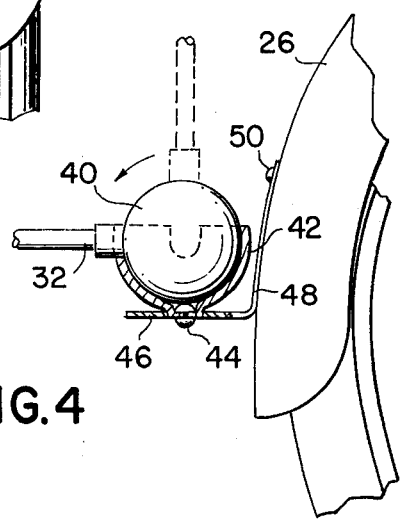
FIG. 4 is a side view taken substantially on viewing Plane 4—4 of FIG. 2, showing the mounting bracket and universal cup and ball joint of the device.

As seen in FIGS. 2, 3 and 4, the flag pole 32 is supported on a universal joint type of bearing ball member 40, seated in a ball receiving socket member 42, which is secured by rivet or screw 44 to the base plate flange 46 of the angle iron base member 48, which is in turn secured to the rear fender by rivets, screws or bolts 50. From the above, it is seen that the universal ball joint type of joint support enables the flag pole 32 to be turned in any desired direction, that is, to the left, to the right, or to the rear, as shown by the broken lines in the views, and also to an upright position when the bicycle is placed in a brightly lighted area, in a bike rack at a school or other place, or when the traffic is not enough to warrant its use.

According to a further embodiment of the invention, it is proposed to mount removably on the outer end of the flag pole, as seen in FIG. 2, a supplemental direction indicating arrow member 52 pointing along the axis of the flag pole, and of a highly visible material which is secured removably to the flag pole when desired by then slipping over the end of the pole, to indicate left turn, right turn or straight ahead.

When the supplemental is to be used, a light wire 54 may be attached at one end to a small eyelet or collar 56 on the flag pole, and the other end of the wire 54 is either held in the hand of the cyclist, or attached within reach, such as to the handlebars, rear seat, or rear fender within reach, so the cyclist can, without dismounting, pull or push the flag pole from one position to another, both for signalling his or her presence on the road to other motorists and cyclists, but also to indicate a change of direction intended when the arrow cone 52 is used. For this purpose, the direction arrow cone member 52 may be made of highly visible sheet material, but may also be made of a solid conical material of light weight plastics, so that it is visible from all angles.

Although I have described my invention in specific terms, it is understood that various changes may be made in size, shape, materials and arrangement without departing from the spirit and scope of the invention as claimed.

Having described the invention, what is claimed as new is:

1. A signal and flag device for use on wheeled vehicles such as bicycles, tricycles, minibikes and the like having at least one rear traction wheel carried by a vehicle frame portion, said signal and flag device comprising flag means, flag pole post means engaging said flag means for supporting the same, flag pole post support base means engaging said post means for supporting the same, said flag means carried jointly by said support base means and said flag pole post means for swiveling said flag pole means into any of a plurality of possible angularly oriented and stationary positions about said support base means for displaying said flag means in any of said angular and stationary positions, said vehicle frame portion comprising a mudguard fender means extending over a portion of said rear traction wheel for movement with said frame portion, connecting means for connecting said flag pole post support base means to said mudguard fender means for support thereon such that said flag pole post means is angularly orientable about said support base means to display said flag means in a direction oriented to the left, right, upright, rearwardly and in any other selected direction about said support base means on related movement of said flag pole post means, said flag pole post support base means comprising a base plate portion secured to said mudguard fender means, flange means formed integrally with said base plate portion and extending outwardly therefrom, said connecting means being carried jointly by said support base means and said mudguard fender means for supporting said flag pole post means thereon, said flag pole support base means comprising an upwardly open hollow ball joint cup member, said flag pole post means comprising a lower spherical seating end swivel portion seated in said hollow ball joint cup member, whereby said flag pole post means is movable angularly about the center of said lower spherical seating end swivel portion for moving said flag means from a neutral position to any desired angular position related to the safety of the cyclist in traffic, supplementary indicating directional means constructed and arranged for being removably carried on an outer end portion of said flag pole post means for movement therewith and comprising a direction indicating body portion formed of lightweight material and bearing a light responsive and luminescent pigment material for becoming highly visible to onlookers, traffic, other vehicles and pedestrians, under ambient lighting conditions and on impingement of motor vehicle lights thereon for giving a visual direction signal to others, said supplementary indicating means comprising said indicating body portion construction in the form of a solid conical arrow shaped body and formed from a highly visible material for pointing as an arrow to indicate desired directional movement of the cyclist, and a flexible wirelike tie and directing means engaged at one end to said flag pole post means and engaged at its other end in loosely secured relationship to a portion of said vehicle, and said wirelike tie being within reach of the hands of the cyclist so that pulling or pushing of said tie causes the angular orientation of said flag pole means to be varied without necessitating dismounting by the cyclist from the cycle.

* * * * *